US008296438B2

(12) United States Patent
Brown et al.

(10) Patent No.: US 8,296,438 B2
(45) Date of Patent: Oct. 23, 2012

(54) DYNAMICALLY CONFIGURING A ROUTER TO FIND THE BEST DHCP SERVER

(75) Inventors: Michael W. Brown, Austin, TX (US);
Brian K. Howe, Round Rock, TX (US);
Radhakrishnan Sethuraman, Austin, TX (US); Manuel Silveyra, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 11/776,241

(22) Filed: Jul. 11, 2007

(65) Prior Publication Data

US 2009/0019164 A1 Jan. 15, 2009

(51) Int. Cl.
*G06F 15/16* (2006.01)
(52) U.S. Cl. .......................... 709/227; 709/241; 370/389
(58) Field of Classification Search .................... 709/227
See application file for complete search history.

(56) References Cited

U.S. PATENT DOCUMENTS

| | | | | |
|---|---|---|---|---|
| 6,304,913 | B1* | 10/2001 | Rune | 709/241 |
| 6,424,654 | B1* | 7/2002 | Daizo | 370/401 |
| 6,795,858 | B1 | 9/2004 | Jain et al. | |
| 6,922,724 | B1* | 7/2005 | Freeman et al. | 709/223 |
| 7,200,678 | B1* | 4/2007 | Bettadahalli et al. | 709/245 |
| 7,213,065 | B2* | 5/2007 | Watt | 709/223 |
| 7,257,515 | B2* | 8/2007 | Haeuptle | 702/185 |
| 7,401,114 | B1* | 7/2008 | Block et al. | 709/203 |
| 7,650,405 | B2* | 1/2010 | Hood et al. | 709/224 |
| 2001/0029545 | A1* | 10/2001 | Takahashi et al. | 709/234 |
| 2004/0103194 | A1 | 5/2004 | Islam et al. | |
| 2004/0111640 | A1* | 6/2004 | Baum | 713/201 |
| 2004/0117358 | A1* | 6/2004 | von Kaenel et al. | 707/3 |
| 2004/0122902 | A1* | 6/2004 | Anderson | 709/206 |
| 2004/0177133 | A1* | 9/2004 | Harrison et al. | 709/220 |

(Continued)

FOREIGN PATENT DOCUMENTS

CN 101197811 A 12/2006

(Continued)

OTHER PUBLICATIONS

Volz, "Load Balancing for DHCPv6," IETF Standard-Working-Draft, Internet Engineering Task Force, IETF, CH, vol. dhc, No. 2, Aug. 1, 2002.

(Continued)

*Primary Examiner* — Firmin Backer
*Assistant Examiner* — Hamza Algibhah
(74) *Attorney, Agent, or Firm* — Matthew B. Talpis; Gregory K. Goshorn; Greg Goshorn, P.C.

(57) ABSTRACT

Provided is a method for assigning a domain host configuration protocol (DHCP) server from a list of available DHCP servers based upon user selected criteria. When a network router receives a request for an IP address from a computer, or "client," connected to a network, the request is analyzed for information related to both the client and the available DHCP servers. The analysis may be based upon a number of factors such as the number of previous requests to a particular DHCP server and the proximity of the servers to the computer requesting the IP address. Once the router determines an appropriate DHCP server for a particular IP address request, the client request is forwarded to that DHCP server. The process is completely transparent to both the requesting client and to the selected DHCP server.

20 Claims, 5 Drawing Sheets

U.S. PATENT DOCUMENTS

| | | | |
|---|---|---|---|
| 2005/0114544 A1* | 5/2005 | Chu et al. | 709/245 |
| 2005/0172011 A1* | 8/2005 | Gourlay et al. | 709/219 |
| 2005/0251500 A1* | 11/2005 | Vahalia et al. | 707/1 |
| 2006/0047826 A1* | 3/2006 | Cromer et al. | 709/229 |
| 2006/0084417 A1* | 4/2006 | Melpignano et al. | 455/418 |
| 2006/0106896 A1 | 5/2006 | Carlson et al. | |
| 2006/0198320 A1* | 9/2006 | Hsu et al. | 370/254 |
| 2006/0218289 A1* | 9/2006 | Assad | 709/229 |
| 2007/0174435 A1* | 7/2007 | Piercy et al. | 709/220 |
| 2007/0183426 A1* | 8/2007 | Daude et al. | 370/392 |
| 2007/0192506 A1* | 8/2007 | Gupta et al. | 709/238 |
| 2007/0250608 A1* | 10/2007 | Watt | 709/222 |
| 2008/0025230 A1* | 1/2008 | Patel et al. | 370/252 |
| 2008/0025299 A1* | 1/2008 | Agarwal et al. | 370/389 |
| 2008/0030764 A1* | 2/2008 | Zhu et al. | 358/1.15 |
| 2008/0172476 A1* | 7/2008 | Daniel et al. | 709/220 |
| 2008/0198749 A1* | 8/2008 | Nguyen et al. | 370/235 |
| 2008/0228713 A1* | 9/2008 | Emura et al. | 707/3 |
| 2008/0282325 A1* | 11/2008 | Oyama et al. | 726/4 |
| 2008/0300059 A1* | 12/2008 | Adiraju et al. | 463/42 |
| 2008/0310375 A1* | 12/2008 | Akram et al. | 370/338 |
| 2009/0007246 A1* | 1/2009 | Gutowski et al. | 726/6 |

FOREIGN PATENT DOCUMENTS

| | | |
|---|---|---|
| FR | EP-1073244 A1 * | 1/2001 |
| WO | WO2006127887 A2 | 11/2006 |

OTHER PUBLICATIONS

Fry et al., "A Caching DHCP Relay," Internet citation, 1997, pp. 1-13, <www.cs.rpi.edu/research/pdf/97-10.pdf>; retrieved on Jun. 25, 2008.

* cited by examiner

DYNAMICALLY CONFIGURING A ROUTER TO FIND THE BEST DHCP SERVER

TECHNICAL FIELD

The present invention relates generally to network communication and, more specifically, to a system and method for assigning a domain host configuration protocol (DHCP) server based upon user-selected criteria.

BACKGROUND OF THE INVENTION

Since computers were invented, users have been inventing ways to connect them together. Advantages to computer connectivity are numerous and increasing. For example, computers connected to each other can share data and applications as well as resources such as printers and communication connections. One big leap forward in the area of computer connectivity is the Internet, a collection of computers that span the world and share a common communication protocol. Typically, each computer that accesses the resources of the Internet is assigned an internet protocol (IP) address that uniquely identifies that computer and enables information to be transmitted and received from other computers.

Although there are billions of possible IP addresses available, sometimes to is advantageous for groups of computers to share a particular IP address or group of IP addresses. For example, a local area network (LAN) may have a range of defined IP addresses that are assigned to individual computers as needed. To automatically implement this functionality, DHCP has been developed.

A DHCP server assigns an IP address to a requesting computer for the purpose of communicating both locally within a LAN and to other computers across the Internet. For example, a computer such as a laptop typically connects to a particular LAN, requests an IP address from a DHCP server also connected to the LAN and then employs the assigned IP address to communicate locally and across the Internet. Each IP addressed is assigned to a requesting computer for a specific period of time, typically ranging from an hour to several months, although the period may also be set to not expire. The specific period of time a particular IP address is assigned to a device is referred to as a "lease" for the device. The DHCP server does not assign the same IP address to a second computer while a first computer is "leasing" the address. In this manner, a limited number of IP address can be used by a larger number of computers, thus enabling a network to provide connectivity to multiple devices using fewer IP addresses than would otherwise be necessary.

Any particular computer that requests an IP address may have multiple DHCP servers available to satisfy the request. What is wanted and needed is a system and method for assigning a DHCP server to a requesting computer based upon user selected criteria, such as but not limited to, relative locations of available DHCP servers and the requesting computer.

SUMMARY OF THE INVENTION

Provided is a method for assigning a domain host configuration protocol (DHCP) server from a list of available DHCP servers based upon user selected criteria. When a network router receives a request for an IP address from a computer, or "client," connected to a network, the request is analyzed for information related to both the client and the available DHCP servers. The analysis may be based upon a number of factors such as the number of previous requests to a particular DHCP server and the proximity of the servers to the computer requesting the IP address. For example, if the request is based upon proximity, the network router may analyze the number of connections, or "hops," between the DHCP server and the client, the average response time of particular DHCP servers and/or predefined geographical information related to both the requesting client and each particular DHCP server.

Once the router determines an appropriate DHCP server for a particular IP address request, the client request is forwarded to that DHCP server. In this manner, a distributed branch network is able utilize the fastest DHCP server and is able to function without a dedicated branch server. The process is completely transparent to both the requesting client and to the selected DHCP server.

This summary is not intended as a comprehensive description of the claimed subject matter but, rather, is intended to provide a brief overview of some of the functionality associated therewith. Other systems, methods, functionality, features and advantages of the invention will be or will become apparent to one with skill in the art upon examination of the following figures and detailed description.

BRIEF DESCRIPTION OF THE FIGURES

A better understanding of the present invention can be obtained when the following detailed description of the disclosed embodiments is considered in conjunction with the following figures, in which.

DETAILED DESCRIPTION OF THE FIGURES

Although described with particular reference to a computing system that implements dynamic host configuration protocol (DHCP), the claimed subject matter can be implemented in any information technology (IT) system in which dynamic control of network IP address assignment is desirable. Those with skill in the computing arts will recognize that the disclosed embodiments have relevance to a wide variety of computing environments in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a network router, microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for dynamic control of network IP address assignment. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
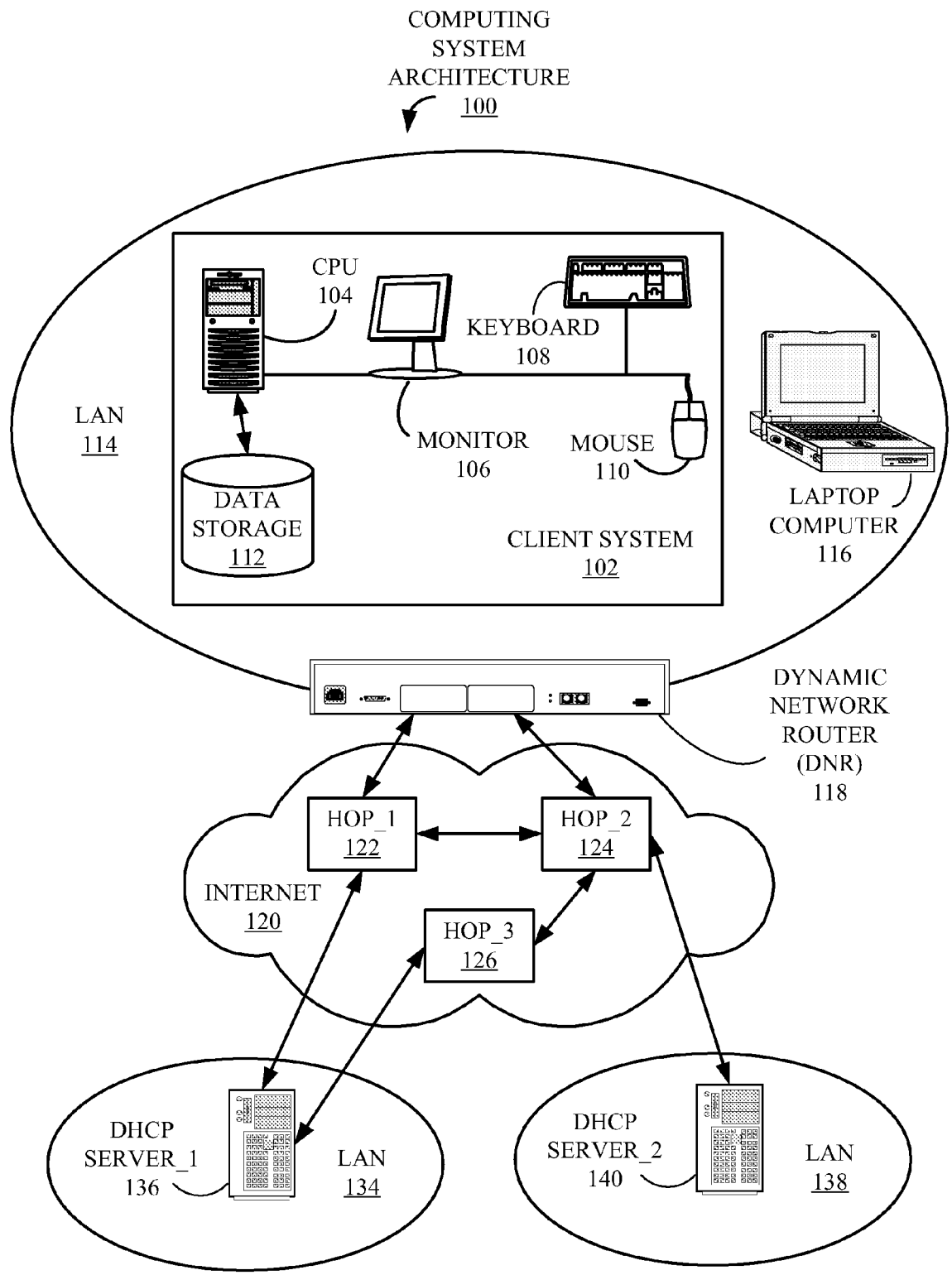
FIG. 1 is a block diagram of one example of a computing system architecture that includes a dynamic network router (DNR) for implementing the claimed subject matter.

Turning now to the figures, FIG. 1 is a block diagram of an example of a computing system architecture 100 that implements the claimed subject matter. Computing system 100 includes a local area network (LAN) 114, a LAN 134 and a LAN 138, each of which are communicatively coupled and communicate with each other via the Internet 120. Coupled to LAN 114 are a client system 102, a laptop computer, or "laptop", 116 and a dynamic network router (DNR) 118. Those with skill in the computing and communication arts should be familiar with computers, LANs and routers. It should be noted that, in addition to the logic associated with a typical router, DNR 118 also includes logic for implementing the claimed subject matter.

Computing system 102 includes a central processing unit (CPU) 104, coupled to a monitor 106, a keyboard 108 and a mouse 110, which together facilitate human interaction with computer 102. Also included in computer 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). Computing system 102 is one example of a device that may take advantage of the claimed subject matter although the following description focuses on an implementation by DNR 118. Although not shown in FIG. 1, DNR 118 may be accessed via monitor 106, keyboard 108 and mouse, or touch pad, 110 (see FIG. 2). DNR 118 is explained in more detail below in conjunction with FIGS. 2-5.

LAN 134 and LAN 138 include a DHCP server_1 136 and a DHCP server_2 140, respectively. LAN 114 is coupled to LAN 134 via router 118 and the Internet 120. Included in Internet 120 are examples of three (3) relay points or "hops," i.e. a hop_1 122, a hop_2 124 and a hop_2 126. In this example, a signal from a computing device such as client system 102 or laptop 116 is routed to DHCP server_1 136 on LAN 134 via hop_1 122, via hop_2 124 and hop_1 122, or via hop_2 124 and hop_3 126. In a similar fashion, a signal from a computing device such as client system 102 or laptop 116 is routed to DHCP server_2 140 on LAN 138 via hop_2 124 or via hop_1 122 and hop_2 124. Those with skill in the computing and/or communication arts should appreciate that FIG. 1 is a simplified illustration of a networked computing system used for illustrative purposes only and that there are many possible configurations relevant to the disclosed technology. For example, LAN 114, LAN 134 and LAN 138 would typically include additional computing devices like client system 102. In addition, LAN 134 and LAN 138 would typically include standard routers (not shown) or a router such as DNR 118.

Figure 2:
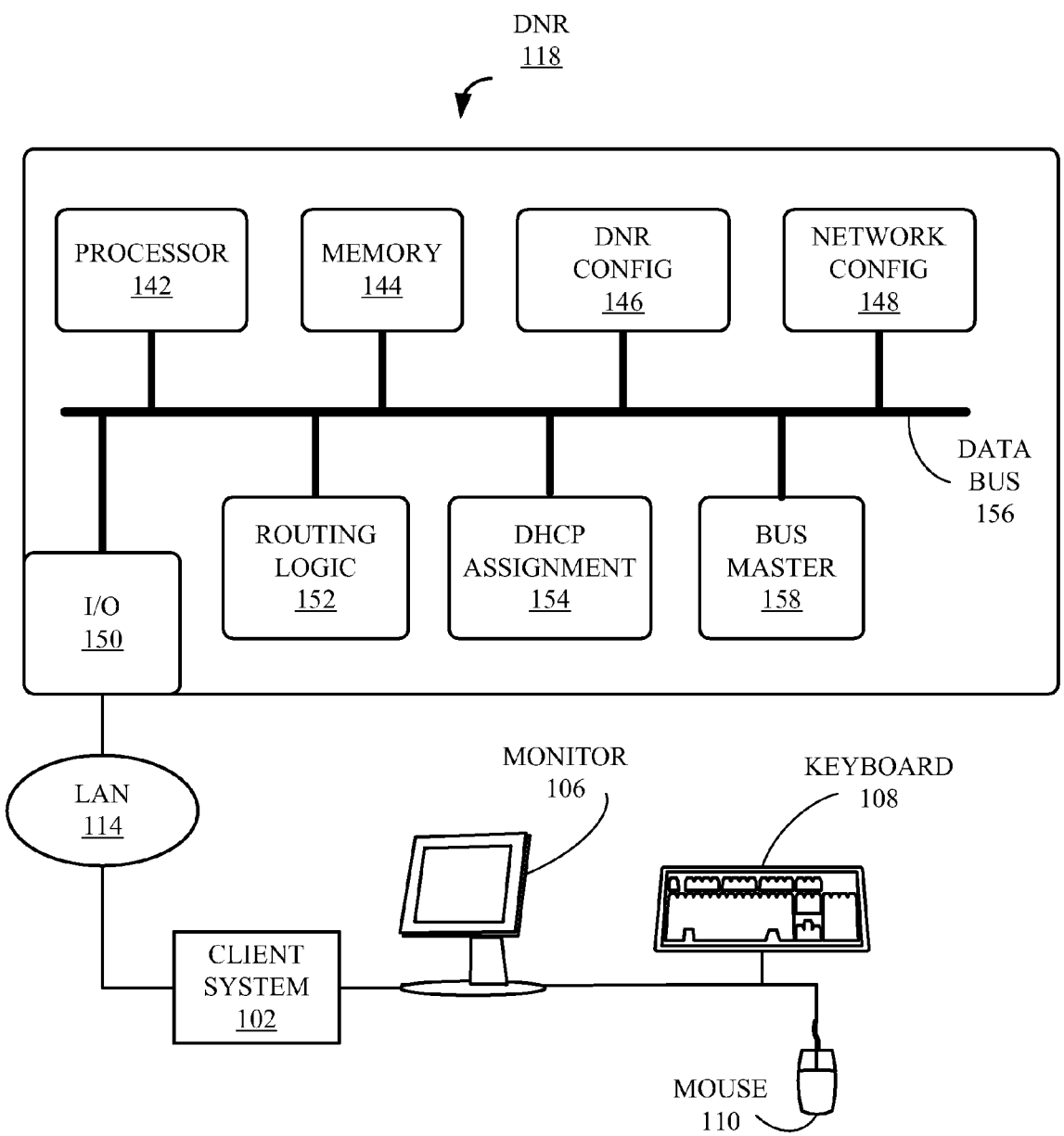
FIG. 2 is a block diagram of the DNR of FIG. 1 in more detail.

FIG. 2 is a block diagram of DNR 118 of FIG. 1 in more detail. Functional modules include a processor 142, a memory 144, a DNR configuration (config.) module 146, a network config. module 148, an Input/Output (I/O) module 150, a routing logic module 152 and a DHCP assignment module 154. Each of modules 142, 144, 146, 148, 150, 152 and 154 are coupled to a data bus 156, which enables modules 142, 144, 146, 148, 150 and 152 to communicate with each other. Traffic on data bus 156 is controlled by a bus master 158. As explained above in conjunction with FIG. 1, DNR 18 is accessed via I/O module 150, LAN 114 (FIG. 1) and client system 102 (FIG. 1) using monitor 106 (FIG. 1), keyboard 108 (FIG. 1) and touch pad 110 (FIG. 1), thus enabling human interaction with DNR 118.

Processor 142 executes logic associated with modules 144, 146, 148, 150, 152 and 154 to implement the claimed subject matter. Memory 144 provides storage for data and executables employed by processor 142. DNR configuration module 146 provides non-volatile storage for information employed in the claimed subject matter. Simply stated, module 146 stores information related to the configuration of DNR 118 itself including, but not limited to, parameters relating to potentially available DHCP servers such as DHCP server_1 136 (FIG. 1) and DHCP server_2 140 (FIG. 1). The setup and use of information stored in module 146 is explained in more detail below in conjunction with FIGS. 3-5.

Network config. module 148 stores information relating to LAN 114 (FIG. 1), LAN 134 (FIG. 1), LAN 138 (FIG. 1) and Internet 120 (FIG. 1), including information on hop_1 122, hop_2 124 and hop_3 126. For example, network config. module 148 stores information such as the location of available DHCP servers, such as DHVP server_1 136 and DHCP server_2 140, and available paths between DNR 118 and available DHCP servers. Input/Output (I/O) module 150 handles communication between DNR 118 and other devices such as laptop computer 116 (FIG. 1) and client system 102 (FIG. 1). DHCP assignment module 152 stores information relating to particular DHCP servers assigned to devices that have connected through DNR 118 in response to an address assignment request. In one embodiment, a particular computing device may be assigned a specific DHCP server. In that case, information relating to such an assignment is also stored in DHCP assignment module 152. The functions of modules 142, 144, 146, 148, 150, 152 and 154 are described in more detail below in conjunction with FIGS. 3-5.

Figure 3:
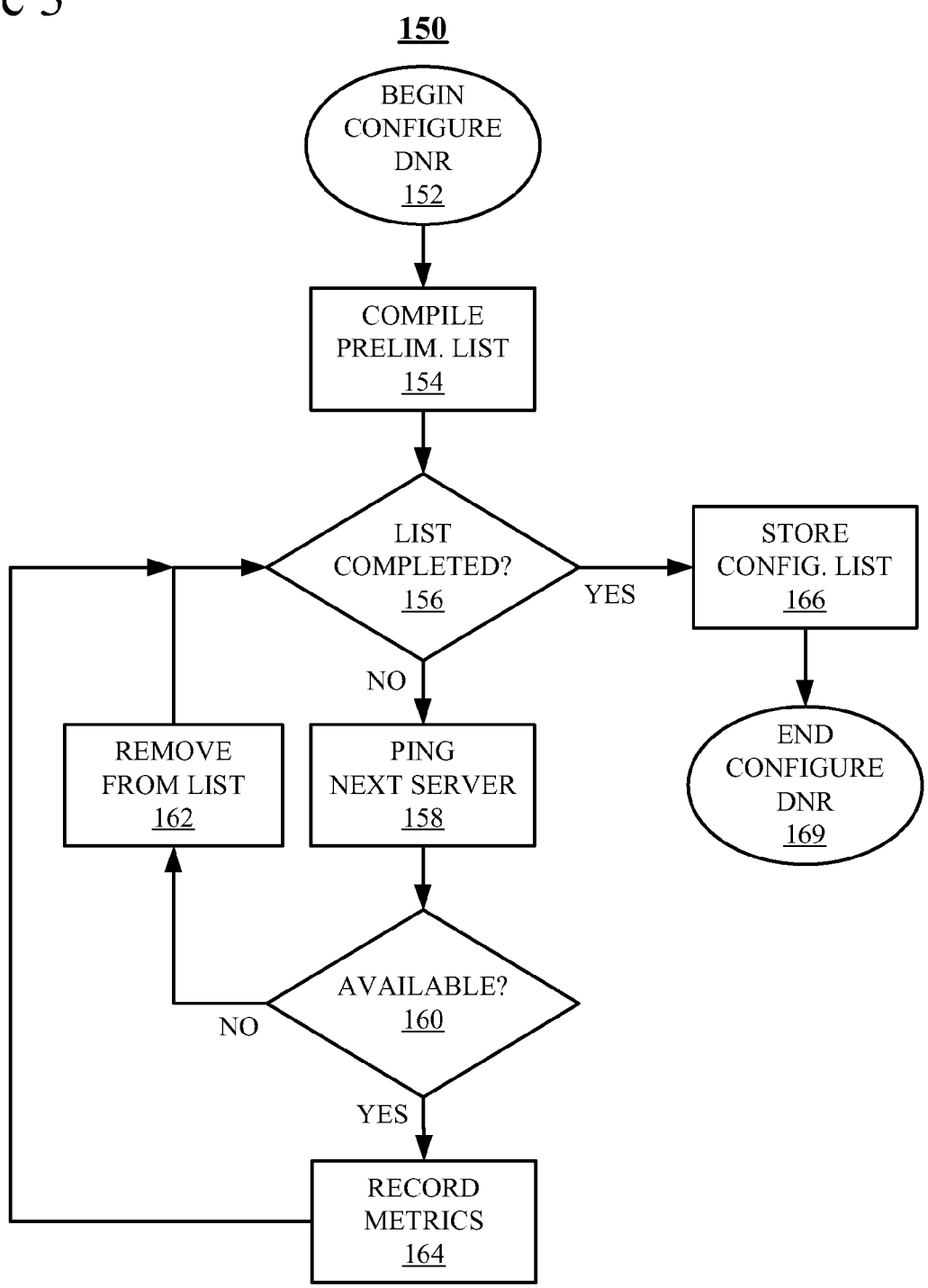
FIG. 3 is a flowchart of a Configure DNR process executed at power up and periodically by the DNR of FIGS. 1 and 2.

FIG. 3 is a flowchart of a Configure DNR process 150 executed by DNR 118 of FIGS. 1 and 2. Process 150 is typically executed by processor 142 (FIG. 2) when DNR 118 is supplied with power on. In addition, process 150 may be executed periodically during operation of DNR 118 to update data tables associated with the claimed subject matter.

Process 150 starts in a "Begin Configure DNR" block 152 and proceeds immediately to a "Compile Preliminary List" block 154. During block 154, process 150 retrieves data from network configuration module 148 concerning the names and address of potential DHCP servers available from LAN 114. During a "List Completed?" block 156 process 150 determines whether or not each potential DHCP server on the list compiled during block 154 has been analyzed for availability and response time. Of course, the first time block 156 is entered no such analysis has been executed. If each server on the list has not yet been analyzed, process 150 proceeds to a "Ping Next Server" block 158.

During block 158, a signal, or "ping," is transmitted to the first server on the list that has yet to be analyzed. A response to the ping enables process to determine availability of the server and to estimate an average response time. In addition, DNR 118 may determine a path via which the ping traveled both to and from the targeted server. One the ping is received and processed of if the ping has a timeout because the targeted server is not available, process 150 proceeds to an "Available?" block 160. During block 160, process 150 determines whether block 160 was entered via a processed ping, which indicates the targeted server is available, or via a timeout, which indicates the server is not available. If the server is unavailable, process 150 proceeds to a "Remove From List" block 162 during which process 150 removes the targeted server form the list generated during block 154. Process 150 then returns to List Completed block 156 and processing continues as described above.

If, during block 160, process 150 determines that a ping from the targeted server has been received, i.e. the server is available, control proceeds to a "Record Metrics" block 164. During block 164, the information about the availability and an approximate response time based upon the length of time for the ping to be returned is stored in conjunction with the list generated during block 154. Once the metrics are recorded, process 150 returns to List Completed? Block 156 and processing continues as described above.

If, during block 156, process 150 determines that the list generated during block 154 is completed, i.e. each server on the list has been pinged, control proceeds to a "Store Configuration List" block 166 during which the list generated during block 154 and modified during iteration through blocks 156, 158, 160, 162 and 164 is stored in network configuration module 148 for use during nominal operations of DNR 118. Nominal operations of DNR 118 are described in more detail below in conjunction with FIGS. 4 and 5. Finally, process 150 proceeds to an "End Configure DNR" block 169 in which process 150 is complete.

Figure 4:
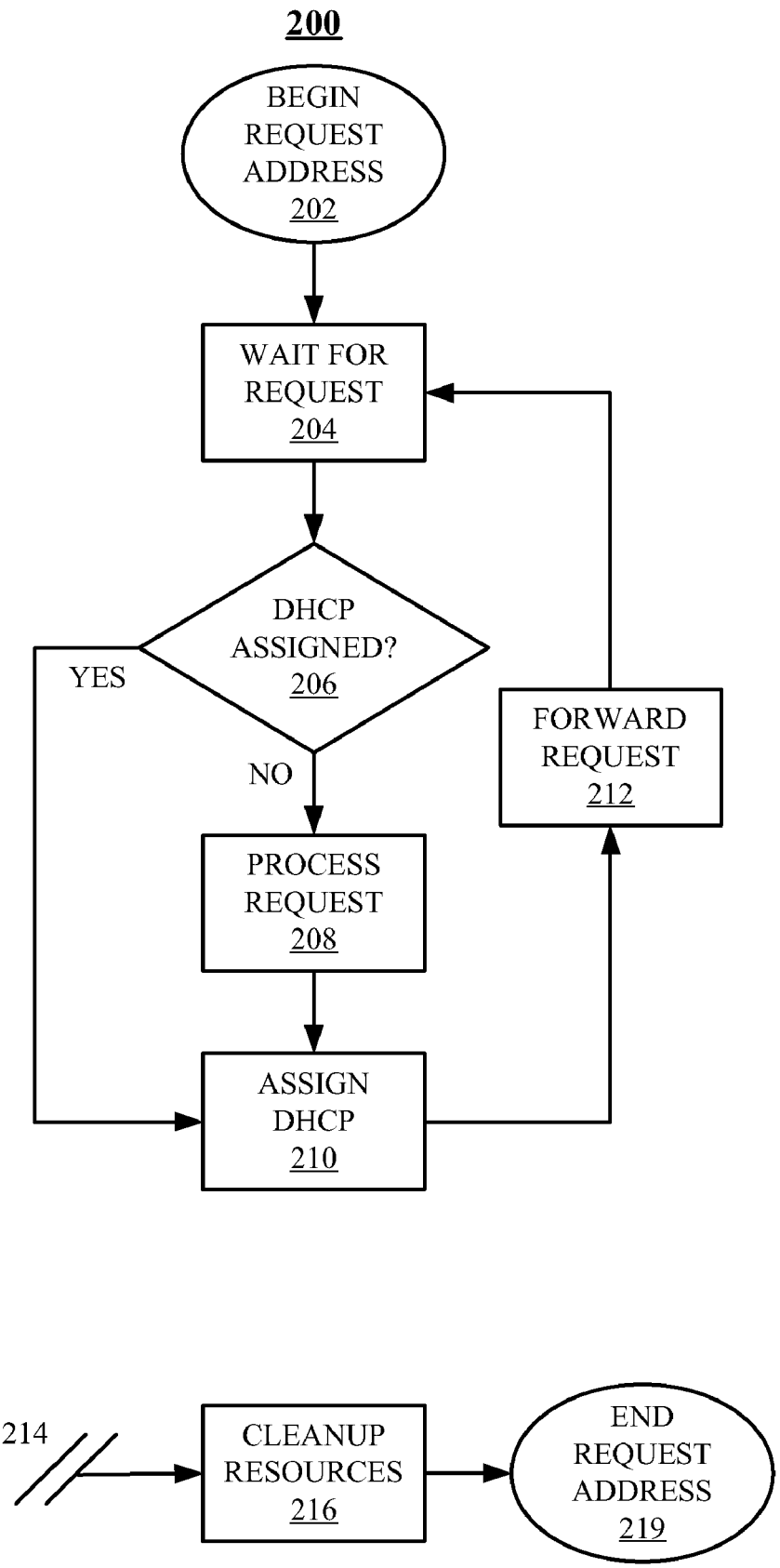
FIG. 4 is a flowchart of a Request Address process initiated by the client computer and implemented by the DNR, both introduced in FIGS. 1 and 2.

FIG. 4 is a flowchart of a Request Address process 200 implemented by DNR 118 (FIGS. 1 and 2). In this example, client system 102 (FIGS. 1 and 2) has initiated a request for an assigned internet protocol (IP) address. Process 200 is executed on the processor 142 (FIG. 2) of DNR 118 (FIGS. 1 and 2). Process 200 may initiated when client system 102 is first coupled to LAN 114 (FIG. 1) and initiates an attempt to establish an address for transmitting and receiving messages from other devices on LAN 114 and from other devices on other networks such as LAN 134 (FIG. 1) via the Internet 120 (FIG. 1). Although describe with respect to client system 102 and LAN 114, process 200 applies equally to any computer on any network. For example, process 200 also describes laptop 116 on the same of a different network or a different computer (not shown) connecting to LAN 138 (FIG. 1) or some other LAN.

It should be understood that in addition to the processing associated with the claimed subject matter, DNR 118 handles standard routing tasks on LAN 114. In the alternative, routing tasks on LAN 114 are handled by a typical router, which forwards DHCP request to a DNR 118 that is specifically configured to handle such requests in accordance with the claimed subject matter.

Process 200 starts in a "Begin Request Address" block 202 and proceeds immediately to a "Wait for Request" block 204. During block 204, DNR 118 waits for a connection request transmitted by a device on LAN 114 (FIG. 1). In this example, a request is transmitted by client system 102. Once DNR 118 receives a request, process 200 proceeds to a "DHCP Assigned?" block 206 during which process 200 determines whether or not the device that transmitted the request received during block 204 has been assigned a specific DHCP. As explained above in conjunction with FIG. 2, this information is stored in DHCP assignment module 152 (FIG. 2). If so, control proceeds to an "Assign DHCP" block 210 during which process 200 assigns the designated DHCP server to the request.

If, during block 206, process 200 determines that the DHCP server request received during block 204 has not been transmitted from a device with an assigned DHCP server, control proceeds to a "Process Request" block 208. Generally, the processing associated with block 208 involves a determination of the best DHCP server for the request. This determination may be based upon a number of factors, including, but not limited to, transmission and processing time and load balancing considerations. Processing associated with block 208 is describes in more detail below in conjunction with FIG. 5. Once processing associated with block 208 is complete, process 200 proceeds to Assign DHCP block 210 during which the DHCP server determined to be the best fit for the requesting device during block 208 is assigned to the request.

Once a DHCP server has been assigned to a request during block 210, process 200 proceeds to a "Forward Request" block 212. During block 212, process 200 forwards the request received during block 204 to the DHCP server assigned to the requesting device during block 210. The processing of a DHCP request from this point, including the processing executed by DNR 118, should be familiar to those with skill in the computing and communication arts. Once the DHCP request has been forwarded, process 200 returns to Wait for Request block 204 during which process 200 waits for another request. Processing then continues as explained above.

Process 200 is designed to execute as long as DNR 118 is operating, i.e. DNR 118 has power available and is turned on. In the event that DNR 118 is powered off or the user wishes to disable DNT 118, an asynchronous interrupt 214 is transmitted to process 200. Asynchronous interrupt 214 takes control of process 200 from whatever point block is currently executing and passes control to a "Cleanup Resources" block 216. During block 216, process 200 frees memory allocated during execution, saves parameters and, possibly saves information relating to the current execution of process 200. Finally, during an "End Process Request" block 219, process 200 is complete.

Figure 5:
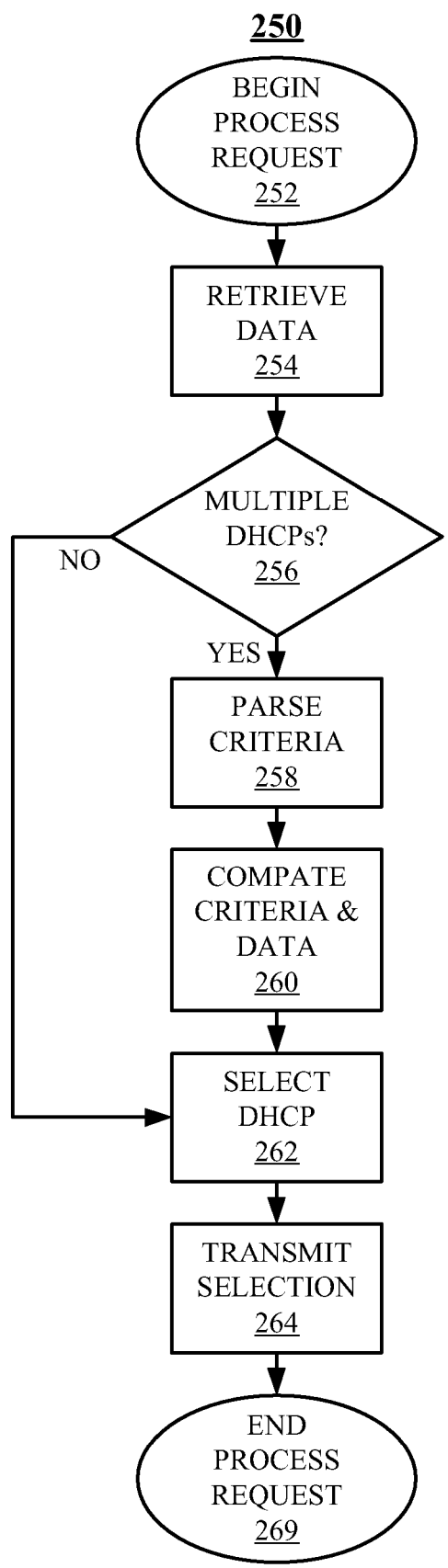
FIG. 5 is a flowchart of a Process Request process executed by the DNR of FIGS. 1 and 2.

FIG. 5 is a flowchart of a Process Request process 250 executed by DNR 118 of FIGS. 1 and 2. Process 250 corresponds to Process Request block 208 of Request Address process 200, both introduced above in conjunction with FIG. 4. Process 250 starts in a "Begin Process Request" block 252 and proceeds immediately to a "Retrieve Data block 254. During block 254, process 250 retrieves information about network configuration form network configuration module 148 (FIG. 2), routing information from routing logic module 152 (FIG. 2) and DHCP assignment information form DHCP assignment module 154 (FIG. 2).

During a "Multiple DHCPs?" block 256, process 250 determines whether or not multiple DHCPS, such as DHCP server_1 136 (FIG. 1) and DHCP server_2 140 (FIG. 1), are currently available. If so, control proceeds to a "Parse Criteria" block 258 during which process 250 analyzes the data retrieved during block 254 to determine any particular requirements for DHCP selection. For example, client system 102 (FIGS. 1 and 2) may specify that an IP address request always be routed to the DHCP server with the fastest response time and laptop computer 116 may specify that the most reliable route be selected. The specific criteria for DHCP selection is user-selectable.

During a "Compare Criteria and Data" block 260, process uses the data retrieved during block 254 and parsed during block 258 to determine the best DHCP server to which to route the IP address request. For example, data retrieved from network configuration module 148 may indicate that DHCP server_1 136 (FIG. 1) via hop_1 122 (FIG. 1) typically has the fastest response time for an IP address request is transmitted. However, other data may indicate that hop_1 122 is offline, which implies that an IP address request directed to DHCP server_2 140 (FIG. 1) via hop_2 124 would currently be faster because a transmission to DHCP server_1 136 would need to be routed via hop_2 124 and hop_3 126 (FIG. 1).

Those with skill in the computing and communication arts should be familiar with many parameters that may be employed in a determination of the most advantageous response time. In addition, other considerations rather than response time may be employed. For example, DHCP server_1 136 may employ security features that make DHCP server_1 136 preferable to DHCP server_2 140 for certain IP address requests from particular computers or applications.

Following block 260, or following block 256 if process 250 has determined that there is only one DHCP server to select, process 250 proceeds to a "Select DHCP" block 262. During block 262, process 250 make a determination as to the best DHCP server to route the current IP address request based upon the criteria of the requesting device and any knowledge DNR 118 may possess concerning the state of the networks through which the transmission must travel. Of course, if control has arrived at block 262 directly from block 256, the single DHCP server is the one selected. During a "Transmit Selection" block 264, the selection made during block 262 is returned to Request Address process 200 so that processing can continue as described above in conjunction with FIG. 4. Finally, control proceeds to an "End Process Request" block 269 in which process 250 is complete.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A method for executing a domain host configuration protocol (DHCP) request, comprising:
   receiving a DHCP request from a client at a routing device;
   accessing, by the routing device, a list of two or more available DHCP servers;
   selecting, by the routing device, a particular DHCP server from the list of available DHCP servers based upon a first criteria; and
   transmitting, by the routing device on behalf of the client, the DHCP request to the particular DHCP server.

2. The method of claim 1, further comprising:
   calculating, by the routing device, a first metric for each DHCP server on the list of available DHCP servers; and
   wherein the selection of the particular DHCP server is based upon the first metric.

3. The method of claim 2, wherein the metric is an expected response time between the client and each DHCP server on the list of available DHCP servers.

4. The method of claim 2, wherein the metric is a security rating corresponding to each DHCP server on the list of available DHCP servers.

5. The method of claim 2, wherein the metric is based upon an estimated processing load corresponding to each DHCP server on the list of available DHCP servers.

6. The method of claim 1, further comprising pinging, by the routing device, each DHCP server on the list of available DHCP servers to determine availability and an expected response time between the client and each DHCP server.

7. The method of claim 1, wherein the routing device is a network routing device.

8. A domain host configuration protocol (DHCP) request device, comprising:
   a routing device,
   a processor coupled to the routing device;
   a list of two or more available DHCP servers; and
   logic, executed on the processor, for:
      receiving a DHCP request from a client;
      selecting a DHCP server from the list of available DHCP servers based upon a first criteria; and
      transmitting, by the routing device on behalf of the client, the DHCP request to the selected DHCP server.

9. The device of claim 8, the logic further comprising logic for:
   calculating a first metric for each DHCP server on the list of available DHCP servers; and
   wherein the selection of a DHCP server is based upon the first metric.

10. The device of claim 9, wherein the metric is an expected response time between the client and each DHCP server on the list of available DHCP servers.

11. The device of claim 9, wherein the metric is a security rating corresponding to each DHCP server on the list of available DHCP servers.

12. The device of claim 9, wherein the metric is based upon an estimated processing load corresponding to each DHCP server on the list of available DHCP servers.

13. The device of claim 8, the logic further comprising logic for pinging each DHCP server on the list of available DHCP servers to determine availability and an expected response time for each DHCP server.

14. The device of claim 8, wherein the routing device is a network routing device.

15. A computer programming product for executing a domain host configuration protocol (DHCP) request, comprising:
   a memory; and
   logic, stored on the memory for execution on a processor associated with a routing device, for:
      receiving a DHCP request from a client;
      accessing a list of two or more available DHCP servers;
      selecting a DHCP server from the list of available DHCP servers based upon a first criteria; and
      transmitting, from the routing device on behalf of the client, the DHCP request to the selected DHCP server.

16. The computer programming product of claim 15, the logic further comprising logic for:
   calculating a first metric for each DHCP server on the list of available DHCP servers;
   wherein the selection of a DHCP server is based upon the first metric.

17. The computer programming product of claim 16, wherein the metric is an expected response time between the client and each DHCP server on the list of available DHCP servers.

18. The computer programming product of claim 16, wherein the metric is a security rating corresponding to each DHCP server on the list of available DHCP servers.

19. The computer programming product of claim 16, wherein the metric is based upon an estimated processing load corresponding to each DHCP server on the list of available DHCP servers.

20. The computer programming product of claim 15, the logic further comprising logic for pinging each DHCP server on the list of available DHCP servers to determine availability and an expected response time for each DHCP server.

* * * * *